(12) United States Patent
Parente et al.

(10) Patent No.: US 9,552,842 B2
(45) Date of Patent: Jan. 24, 2017

(54) SYSTEMS AND METHODS FOR MANAGING THE PROCESS OF CREATING CUSTOM PROFESSIONAL VIDEOS

(71) Applicant: Branding Shorts, Hoboken, NJ (US)

(72) Inventors: Anthony Parente, New York, NY (US); Michelina Pagano-Parente, New York, NY (US)

(73) Assignee: BRANDING SHORTS, LLC, Hoboken, NJ (US)

( * ) Notice: Subject to any disclaimer, the term of this patent is extended or adjusted under 35 U.S.C. 154(b) by 32 days.

(21) Appl. No.: 14/526,497

(22) Filed: Oct. 28, 2014

(65) Prior Publication Data

US 2015/0117840 A1    Apr. 30, 2015

Related U.S. Application Data

(60) Provisional application No. 61/896,360, filed on Oct. 28, 2013.

(51) Int. Cl.
| | |
|---|---|
| *G11B 27/00* | (2006.01) |
| *G11B 27/031* | (2006.01) |
| *G11B 27/34* | (2006.01) |
| *H04N 21/472* | (2011.01) |
| *H04N 21/854* | (2011.01) |

(52) U.S. Cl.
CPC ............ *G11B 27/031* (2013.01); *G11B 27/34* (2013.01); *H04N 21/47205* (2013.01); *H04N 21/854* (2013.01)

(58) Field of Classification Search
None
See application file for complete search history.

(56) References Cited

U.S. PATENT DOCUMENTS

| | | | |
|---|---|---|---|
| 8,347,213 B2 | 1/2013 | Clifton et al. | |
| 8,717,367 B2 | 5/2014 | Clifton et al. | |
| 8,737,367 B2 | 5/2014 | Bitterlich | |
| 2009/0196570 A1 | 8/2009 | Dudas et al. | |
| 2010/0119203 A1* | 5/2010 | Lewis | G06Q 30/0284 386/278 |
| 2011/0026898 A1 | 2/2011 | Lussier et al. | |
| 2012/0315020 A1* | 12/2012 | Fiumi | H04N 21/258 386/278 |
| 2013/0275312 A1 | 10/2013 | Claman et al. | |

* cited by examiner

*Primary Examiner* — Heather Jones
(74) *Attorney, Agent, or Firm* — Carter, DeLuca, Farrell & Schmidt, LLP

(57) ABSTRACT

Systems and methods for creating custom professional videos are disclosed. The system includes client computing devices, an administrator computing device, and professional editor computing devices, all of which communicate with one or more servers via a network. A server of the one or more servers receives media data including at least one image file, text data, and an audio file from a client computing device via a network. The server creates a video job based on the media data and transmits it to a professional editor computing device. The professional editor uses at least one editing application running on the professional editor computing device to create a video based on the video job. The server transmits the created video to the administrator computing device for review. The server transmits the created video to the client computing device upon approval by the administrator.

20 Claims, 17 Drawing Sheets

SYSTEMS AND METHODS FOR MANAGING THE PROCESS OF CREATING CUSTOM PROFESSIONAL VIDEOS

BACKGROUND

The opportunities for small and large companies to use video to promote their business in digital channels and media are expanding rapidly. The channels they are using include: Social media sites (e.g., Facebook, Twitter, Instagram, YouTube, etc.), email and email marketing campaigns, websites, mobile devices (e.g., iPads, mobile phones, etc.), cable TV, Taxi TV, digital media, and many more. The opportunity to showcase video in various venues increases every year. Companies often have content including photographs, key information, and logos that can be used to create a video. With the increased availability and ease of use of digital devices that capture video, many of those companies also have video clips they have shot with digital cameras or their cell phones. This content can be used to create compelling, engaging videos that can help a company drive business.

However, many of these companies lack the resources, time, experience, or skills required to create a compelling, engaging video from their content. Many of these companies do not have a video department, a skilled editor on staff, or the proper software to transform their raw materials into an effective, professional video that can be used in these ever-increasing digital channels to help grow their business.

SUMMARY

In aspects, the present disclosure features systems and methods for managing a process of creating custom professional videos. In one aspect, the present disclosure features a system that includes a server that prompts a client to provide a proper number of image files or image files of a proper length, text data, and an audio file to a system server via a network. The server creates a video job based on the at least one image file, the text data, and the audio file, and stores the video job. The server receives a selection by an administrator of a professional editor to be assigned to the video job. The server associates the professional editor with the stored video job. The server transmits the video job to a professional editor computing device associated with the assigned professional editor. The server then receives a video created by the professional editor using at least one application running on the professional editor computing device based on the at least one image file, the text data, and the audio file. The server then transmits the created video to an administrator computing device for review. If the administrator computing device provides an approval message, the server transmits the created video to the client computing device or makes the created video available for retrieval by the client computing device.

Further features of the present disclosure will become apparent from the following description of exemplary embodiments with reference to the attached drawings.

BRIEF DESCRIPTION OF THE DRAWINGS

FIGS. 7-12 illustrate administrator screens that are displayed by the server according to embodiments of the present disclosure;

DETAILED DESCRIPTION

Figure 1A:
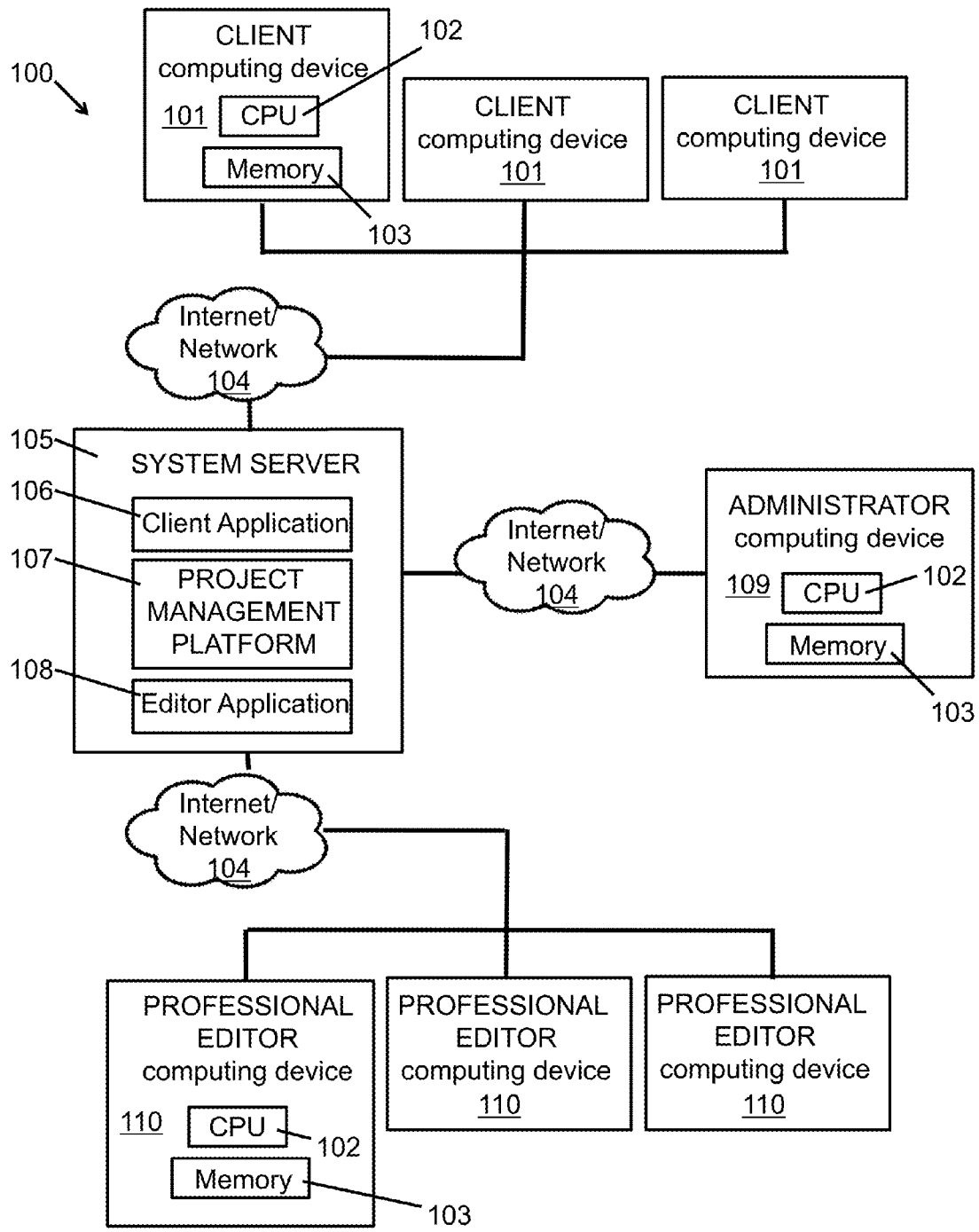
FIG. 1A is a diagram illustrating a system for creating custom professional videos according to an embodiment of the present disclosure.

Although companies see the significant opportunity to use video for promotion, they often, especially small businesses, do not have the funds to pay for a full video production, which includes a camera crew, a location shoot, and professional editing.

What these companies do often have is content. This includes still images or photographs, key information (e.g. reviews), and logos that can be used to create a video. With the increased availability and ease of use of digital devices that capture video, many of those companies also have video clips they have shot with digital cameras or smart phones. This content can be used to create compelling, engaging videos that can help a company drive business.

However, to transform this content into a compelling professional video is not an easy task for most businesses. Most are focused on day to day operations such as customer service, payroll, inventory, rent, etc. Most do not have the resources, time, experience, or skills needed to create a compelling, engaging video from their content. They do not have a video department, a skilled editor on staff, or the proper software to transform their raw content into an effective, professional video that can be used in these ever increasing digital channels to help grow their business.

Even if a company takes the time to find a professional editor, the process of sending the content is not easy. For example, to create a high quality video they would need to send an editor high resolution files, which are typically very large files that cannot be easily emailed. This would require them to collect the files, load them onto an external drive (e.g., flash drive), send them through conventional mail or use another way of transferring files via the internet, such as dropbox, if they have enough space in their account. Most of these companies would not be familiar with the proper format to deliver such material. The company would need to communicate with the editor, via several emails not only to find out how much content to supply, in what format, the mode of delivery but also to convey instructions, and textual content, etc. In addition, if a company would like to add music to its video, the company would search the Internet to identify royalty free songs that would work in their video or rely on the editor to do a search for music, which would mean more email exchanges regarding those selections.

In this process, the company may end up using several modes to deliver the material to an editor for a single project, which can be time consuming and costly. The editor who receives this content must then spend time matching content to various emails with instructions or other communications and collect all the assets for a particular project in one place. This is not the most efficient use of time or funds for either the editor or the company in need of a video. It is also not the most organized process, which may negatively impact the end product, especially for an editor who is often working on multiple projects at the same time.

An editing house may be juggling hundreds of different projects from hundreds of different companies who are sending their content from various locations, in various methods, and at various times. They may have editors working from different locations. This can present a significant organizational issue, which can be time consuming for the editor, who may also be receiving several subsequent emails from various clients with more content or additional comments about their projects over the course of any given time. The optimal solution would be a turnkey, easy to use, low cost process with minimum investment and time from both the company needing a video and the editor.

The systems and methods of the present disclosure solve the above-mentioned problems by providing a client, such as a company, with an easy and cost effective solution for creating custom professional videos. This solution involves delivering the proper content and the proper amount of content to a professional editor in one centralized place. The proper content and the proper amount of content is obtained by: prompting the client to upload content, such as photos, footage, text, audio, etc.; prompting the client for a certain amount of content (e.g., twenty photos or a certain file size for footage); giving tips on the quality of content or how to properly extract high-resolution footage from a smart phone or tips about the type of text to supply (such as reviews or key facts); and giving the client the opportunity to send a message to the editor regarding parameters for the video to be created (e.g., telling the editor to use a specific photo sequence). With this, both the client and the editor have an efficient and streamlined method of delivering and receiving content in a productive, cost-effective way, resulting in a professional end product.

The systems and methods of the present disclosure also give clients a limited amount of time to gather their content and the opportunity to review or revise their content before sending this to an editor, making the work load more efficient for the editor, thereby eliminating any confusion, and saving time and money for the client.

One of the advantages of the systems and methods of the present disclosure is that they give the client the ability to have a professional video created from their content, which is delivered in a streamlined efficient way, by an experienced, professional editor who is strategically thinking about how to create the best, most professional video from the content provided. While other solutions automatically assemble content within a given template, the systems and methods of the present disclosure offer a client a video that is thoughtfully assembled by an experienced professional, using professional software to visually enhance content, to include creative transitions, and to add motion graphics or animate type in a way that is fitting to a company's message or brand to drive results. Since a video is a reflection of the company's image, the quality of that video is an important factor. A company would not benefit from an amateur work depicting its brand image. In summary, the systems and methods of the present disclosure give a client, such as a small company, the opportunity to have a professional, quality video at an affordable price point.

The systems and methods of the present disclosure provide a client interface designed for clients having varying degrees of sophistication and familiarity with audiovisual technology and the web. The client interface is easy to use and intuitive for all clients.

The systems and methods of the present disclosure utilize multiple video editors who are located in different geographic locations. The editor is able to get the content needed for a project or job in an efficient, self-service manner. The project content including image files and text is easily organized and accessed.

The administrator or manager is able to easily and effectively manage the projects or jobs. Using the systems of the present disclosure, the administrator can: access information regarding all users, their roles, and their corresponding access; select editors and assign them to projects or jobs; manage the project content and workspaces; monitor current projects and archive completed projects; and perform other management tasks. The systems and methods of the present disclosure are technology simple but scalable to handle hundreds of projects at any point in time.

As used in the present disclosure, the term video includes moving images, moving pictures, animation, motion graphics, silent video, audiovisual works, digital media, digital art, multimedia, 3D works, and other similar media known to those skilled in the art.

Embodiments of the present disclosure are described in detail below with reference to the drawing figures wherein like reference numerals identify similar or identical elements. It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

FIG. 1A shows the overall architecture of the system in accordance with an embodiment of the present disclosure. As shown in FIG. 1A, a client using client computing devices 101 can access the system server 105 over the Internet/network 104. Each of the client computing devices 101 includes at least a central processing unit (CPU) 102 and a memory 103. The memory 103 stores instructions, which, when executed by the CPU 102, causes a client computing device 101 to connect and communicate with the system server 105 in order to display system data on a display connected to the client computing device 101 and to receive data input by a client via an input/output device connected to or incorporated into the client computing device 101.

Once the client computing device 101 accesses the system server 105, the client is provided with an easy to use client application 106 and is prompted in a series of screens to supply content that will be used by a professional editor to create a video. The content supplied can include still images or video already captured by the client as well as text and audio. The client may have this information stored in a variety of formats on the client computing device 100. The client may also have the opportunity to select a wide variety of audio including music or voice over. In addition, clients can provide parameters or instructions for the editor. These parameters or instructions include, for example, the preferred length of a video, where to place specific images, etc.

Once the client submits content to the system server 105 via the client application 106, an administrator or manager using the administrator computing device 109 can access the project management platform 107 via the Internet/network 104 to view and manage the content submitted by the client. The administrator can also use the project management platform 107 to view, select, and assign an editor to all projects that are submitted. Once an editor is assigned, the assigned editor can access the system server and the content submitted for the project using the editor application 108 via the Internet/network 104. The editor can then download all content and parameters to the editor computing device 110. The editor can be located at any geographic location. Once the video is completed, the editor sends the completed video file back to the administrator via the project management platform 107 for review and feedback. Once the video is approved by the administrator, it can be sent by the project management platform 107 to the appropriate client computing device 101.

Figure 1B:
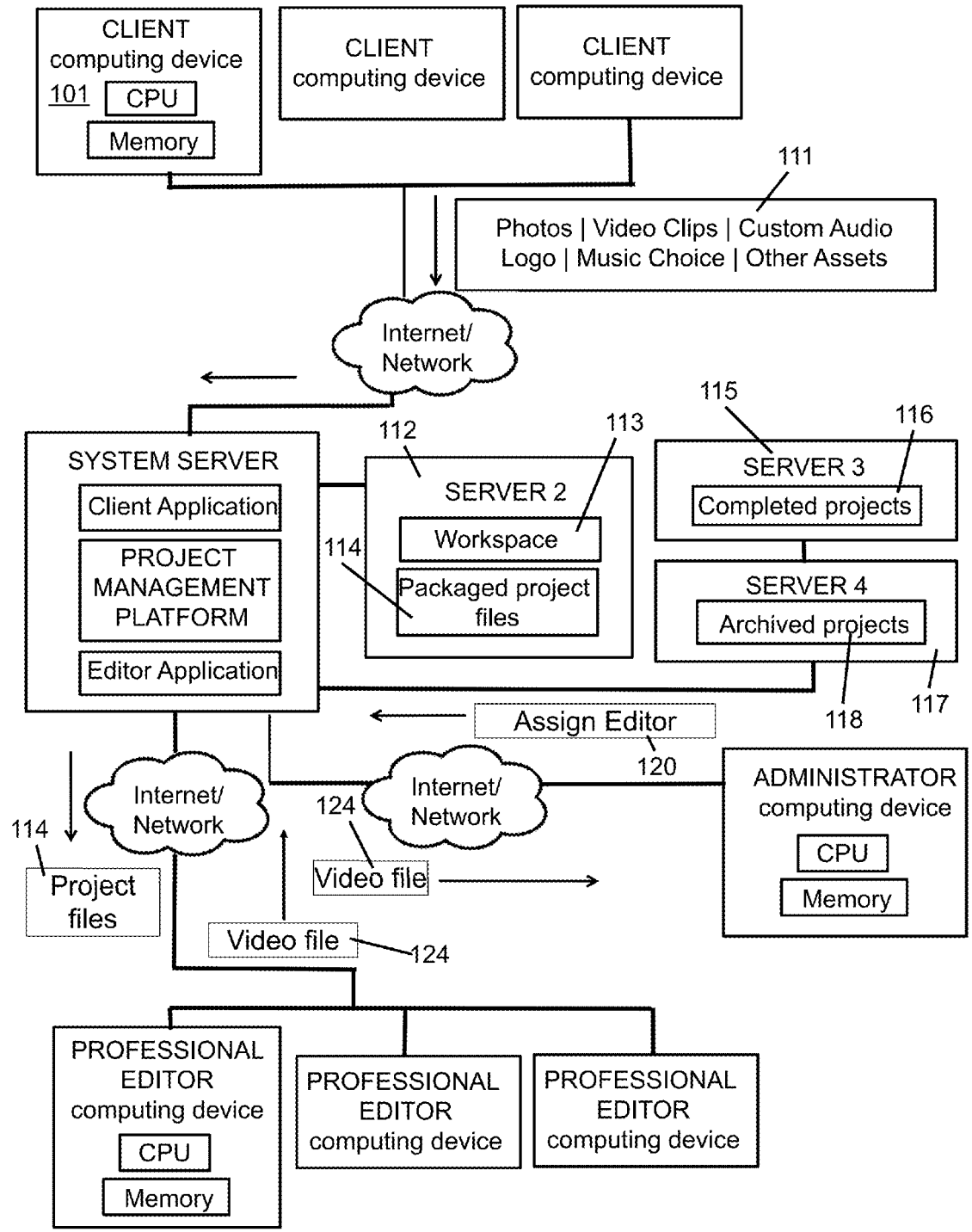
FIGS. 1B and 1C are diagrams illustrating a system for creating custom professional videos according to another embodiment of the present disclosure.
Figure 1C:
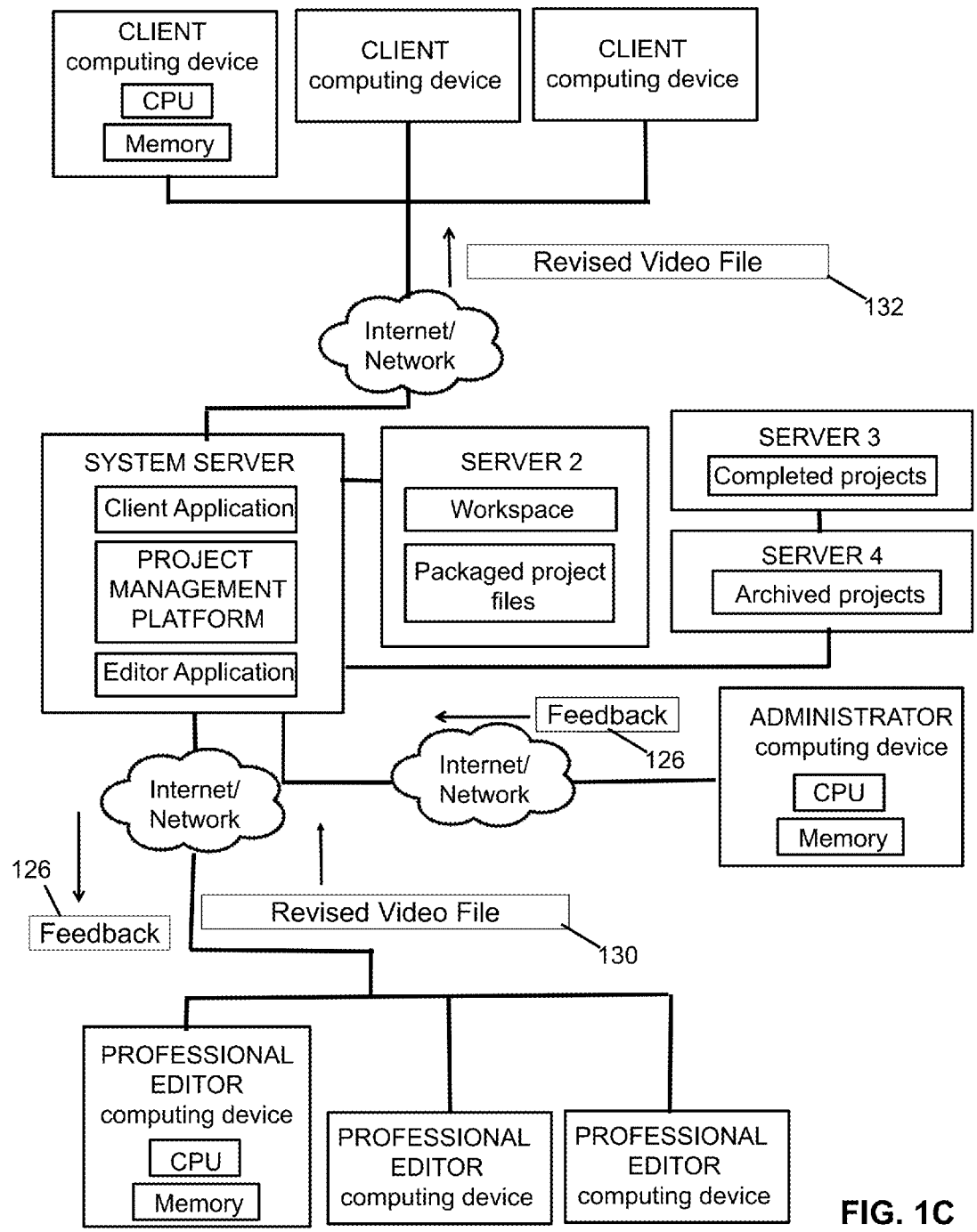

FIGS. 1B and 1C are diagrams illustrating a system for creating custom professional videos and the job flow for a newly submitted job, in accordance with another embodiment of the present disclosure. The system includes the system server 105 with the client application 106, the project management platform 107, and the editor application 108. The system may also include a second server, Server 2, 112 that includes memory for storing the workspace 113 for projects that have been initiated by the client but have not yet submitted for editing. The memory of the second server 112 also stores packaged project files 114 for the projects that have been submitted. There is also a third server, Server 3, 115 that stores projects that are completed 116 and a fourth server, Server 4, 117 that archives projects 118 for an extended period of time.

As shown in FIG. 1B, the system server 105 receives a wide variety of content 111, such as photos, video clips, logos, custom audio, parameters, and/or other assets, from client computing devices 101 located at any geographic location. The client application 106 guides the client on what they can submit, in what format the content should be submitted, and the maximum size of the files for the elements submitted. A series of screens prompt the client through every step of the process. Each time a client initiates or starts a new project, a workspace 113 is created for that project and stored in the second server 112.

The steps in the lifecycle of a workspace are as follows. A client initiates a project by providing needed information to create an account or by signing in, and defining a project with a name. A workspace 113 is then created in the second server 112 and becomes accessible to client computing device 101. Then the client submits content. For example, as shown in FIG. 1B, content 111, which may include photos, video clips, custom audio, a logo, a music selection, and other assets is transmitted by a client computing device 101 to the system server 105 via the Internet/network 104. A client can sign in to the second server 112 and access the project workspace 113. A client can submit content and save it at any time. The content may also be saved by default. Once all content has been submitted, the client indicates it is complete and the administrator or manager is notified that a new project has been submitted.

The manager/administrator reviews the new project or job and assigns it to an editor 120 using the project management platform 107. A manager can sign in and review the new job. The manager can review editors and select an editor for the new job or reassign an editor for a job in progress. Once an editor is assigned, he is notified and is provided access to that job workspace in the second server 112.

The editor using an editor computing device 110 can access the workspace 113 using the editor application 108. An editor can sign in to the editor application 108 and see a list of projects. When she selects a new project, it takes her to the project workspace 113. Within the workspace 113, she can view and download packaged project files 114 associated with the workspace 113.

Once the editor downloads the packaged project files 114, she begins the professional editing process using the editor computing device 110 and the professional editing software installed and running on the editor computing device 110. The editor can be located in any geographic location.

Once the editing process is complete, the editor submits the completed video file 124 via the Internet/network 104 to the third server 115 where it awaits review by an administrator or manager. The video file is stored on the third server 115 and the administrator accesses the completed video file 124 via the Internet or network and the project management platform 107. The administrator reviews the video file and the parameters submitted with the video on the administrator computing device. For example, the manager reviews the video to check for typos, quality of color correction, inclusion of content supplied, audio mix, length of the video, etc.

As shown in FIG. 1C, if feedback and changes are required, the administrator transmits a feedback message 126 to the editor computing device 110 via the project management platform 107 and the Internet/network 104. This step provides quality control for all videos. Alternatively, the editor can access the editor application 108 via the Internet/network 104 to review the feedback message 126 and revise the video accordingly. Should the editor have questions, she can ask the administrator via a chat box in the editor application 108.

Once the editor implements or incorporates any requested changes from the administrator, the revised video 130 is resubmitted for review and the new version replaces the original version on the third server 115. The administrator can then access the third server 115 to review the revised video. Assuming no more revisions are required, the administrator approves the submission by changing the status to "approve" in the project management platform. The editor may then be automatically notified that the video was approved. The administrator can also archive a copy of the video on the fourth server 117. The client may also be sent an e-mail to inform them that the video is ready for review. The e-mail may include a link to the completed video.

Figure 1D:
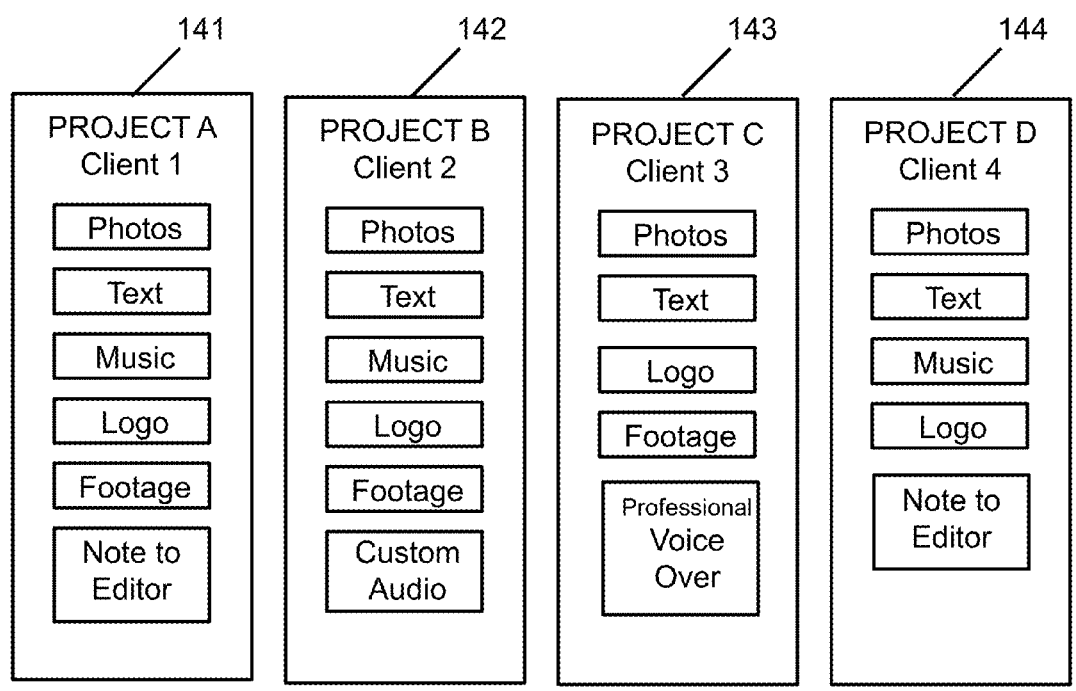
FIG. 1D is a diagram illustrating video projects or jobs according to embodiments of the present disclosure.

FIG. 1D is a diagram illustrating the workspace 113 residing on the second server 112 in accordance with an embodiment of the present disclosure. Overall, the administrator may be managing multiple projects at any time, so multiple workspaces are created and active at once. As shown in FIG. 1D, four projects 141-144 initiated by four different respective clients are stored on the second server 112. A client may have multiple projects ordered but each project has its own workspace with its own content. For example, Project B includes photos, text, music, a logo, footage, and custom audio.

In some aspects, a client can only access workspaces for her projects and an editor can only access workspaces for projects she is assigned. The administrator can access any workspace.

Figure 2:
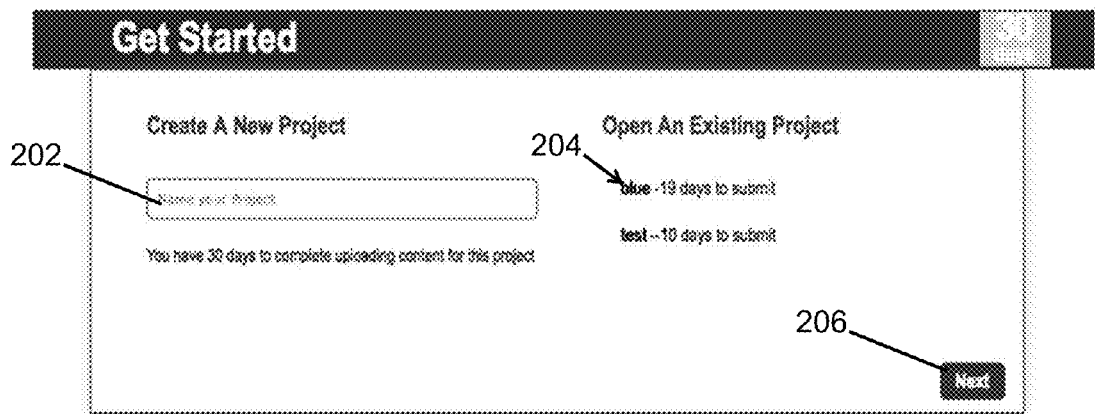
FIGS. 2-6 illustrate client screens that are displayed by the server according to embodiments of the present disclosure.

FIG. 2 illustrates the "Get Started" page, which is the way a project is started in accordance with an embodiment of the present disclosure. After a client signs-up or signs-in successfully, they are taken to the "Get Started" page. If a client has multiple projects active, all the projects are listed by name in the existing projects list 204, along with the timeframe allotted to complete the project. As shown in FIG. 2, the timeframe may be displayed as a number of days left to submit the project or job.

Also, a client has the option to create a new project by clicking on the text "Create a New Project." Once clicked, the client is prompted to type in the project's name in the "Name your Project" field 202. After typing a name in the "Name your Project" filed 202 and clicking on the "Next" button 206, the system server displays a page that instructs the client of what to prepare before beginning the project, such as deciding, collecting, and preparing the files of what content the client would like to upload, including image files and text, prior to beginning the process on the workspace page.

A client is given a limited amount of time to complete a project before it is deleted from the system to avoid filling up the storage space of the system server. The client can also click on the desired existing project, which takes the client to the workspace associated with the given project, which would contain the content previously uploaded.

Figure 3A:
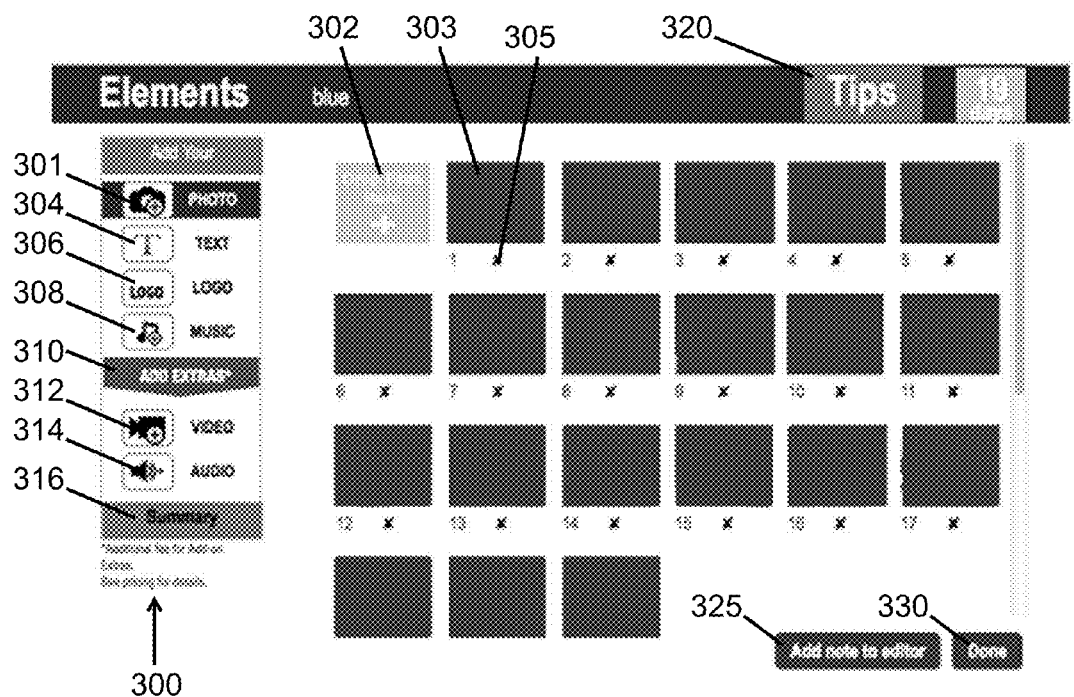

FIG. 3A illustrates a client workspace screen that is displayed after a client has either created a new project or selected an existing project in accordance with an embodiment of the present disclosure.

The elements menu bar 300 illustrates the various content the client can submit to be included in a video. The elements menu bar 300 can include selectable icons or buttons for adding photos 301, text 304, a logo 306, music 308, video 312, audio 314, etc. Each element may have a least one user interface screen for the client to submit the associated content. On the right of the elements menu bar 300, the client workspace screen shows an image gallery of files that have been uploaded and/or remaining available photo slots for upload. A fixed number of photos (e.g., high quality images in formats such as .jpg, .tiff, .png, etc.) can be uploaded with the option to add more once the client reaches the fixed number. A client can upload images in two ways: (1) by uploading a file via a browser (the client can upload several files at a time) or (2) by dragging and dropping an image directly into the workspace at the "Drop File Here" box 302. When an image or footage file is added, it appears as a thumbnail image 303. A selectable "delete" icon 305 is displayed below the thumbnail image 303 enabling a client to delete an image file if necessary.

Figures 3B, 4:

The elements client workspace includes a "Tips" button 320, which, when selected by the client, causes a pop-up window to be displayed. An example of such a pop-up window is shown in FIG. 3B. This pop-up window provides tips to a client to help guide him through the process on each page. For example, one tip may include instructions to the client on the best type of photos to add to a workspace. For example, the tip may state that a restaurant project should include images of food and signage, etc. The "Tips" button 320 may appear in every element page. For example, upon selecting the "Tips" button 320 in the text element page, a pop-up window would tell the client to consider adding a media review, fact, or key point.

One or more of element pages may include a button, which, when selected by a client, allows the client to include a note to the editor, or parameters, for further direction. For example, in the photo element page, the client may select the "Add note to editor" button 325 to instruct the editor of: the order in which the photos should appear in the video, or a selected photo to leave on the screen longer than others, or the suggested length of the entire video.

Once the client is finished with the photo element page of the client application, the client can either click on the "Done" button 330, which brings the client to the next element in the menu bar, which in this example is text, or they can choose another element from the elements menu bar 300. In either case, the image files and associated text that has been submitted is saved in the client's project workspace. On the text screen, a client may be prompted to add a fixed number of text lines with the option to add more, if needed. As in the photo screen, the client may have the opportunity in the text screen to review tips as well as provide notes to the editor or parameters for this section. Examples of text that may be added include reviews of their business and a call to action, such as a web site address or phone number. Once the client has submitted the text the client would like to include, the client can move on to another element such as logo, where the client has the opportunity to submit a logo file. The logo file may include a high quality image in jpeg, tiff, or png format.

FIG. 4 illustrates the music element page in accordance with an embodiment of the present disclosure. The music element page displays a number of different music category buttons 402 and a corresponding listing of different songs 404 from which the client can select a song to play in the background of the video. The category buttons 402 may range from jazz to hip-hop to country music. When the client selects one of the category buttons 402, a listing of different songs 404 for the selected category is displayed. A client can change the list of different songs 404 presented by choosing a desired genre, e.g., pop, rock, etc. Each song is clickable and when clicked, a media/music player 406 will play the chosen song. To stop the song from playing, the client can click on the pause button in the music/media player 406, or click on another song in that music category (which, when clicked, will begin to play), or click on another music category. The client can stop the song and then click on the play button to resume playing the song.

The last song played by the client is the song selected for the project and is automatically saved. A note on the screen of FIG. 4 may indicate the title of the chosen song. The client also has the option to let the editor select the music for them by clicking the check box 410 labeled "Let the editor pick." This enables a process in which a professional editor determines the best music for the project or job. The music library may also be accessible to the clients and editors as a separate link to enable clients and editors doing a full production to access music.

The photos, text, logo, and music are the four basic elements used to create a professional video. As shown in FIG. 4, the music element screen includes a "Checkout" button 414, which, when selected, begins the edit process. The music element screen also includes an "Add Extras" button 412, which, when selected, gives the client an opportunity to add extra content like video footage clips in specific formats (e.g., .mov, .mp4, etc.) up to a limited size (e.g., 50 megabytes per clip for a total of two gigabytes, etc.) or custom audio, such as the client's own music, the client's own voice-over (in formats such as .mp3, .aif, or .wav), or any other audio material. Selecting the "Add Extras" button 412 may also give the client the option to hire a professional voice-over talent for their multimedia project with a submitted script. To begin the process of adding extra content, the client can also click on the video button 312 or the audio button 314 in the "add extras" section 310 in the menu bar.

Figure 5:
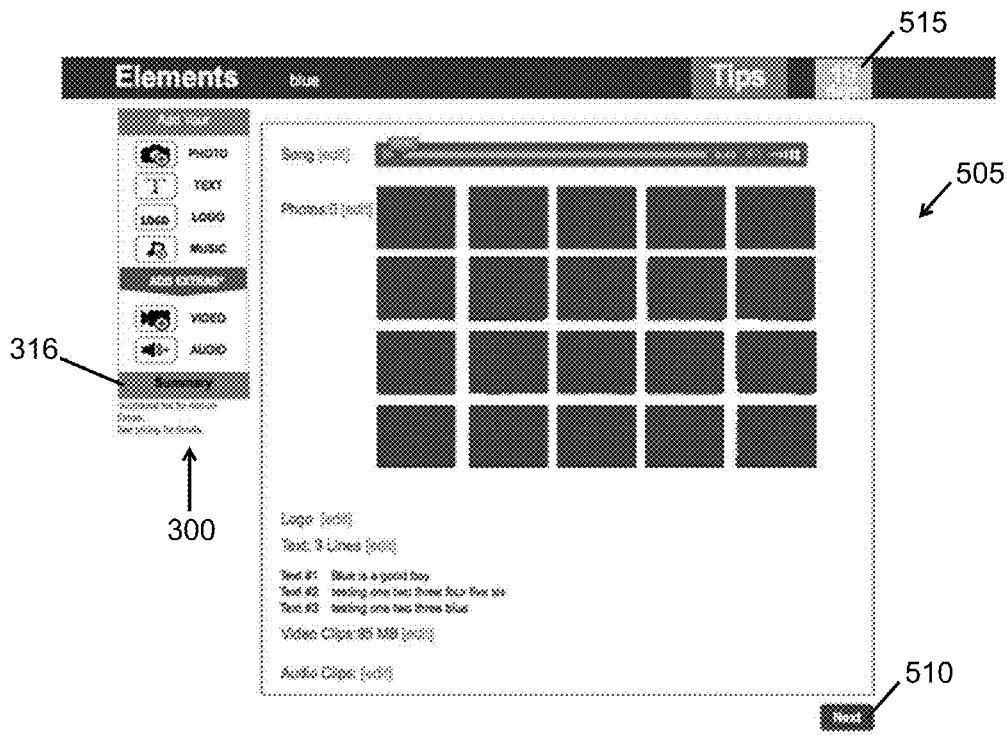

FIG. 5 illustrates a summary page where a client can review all the content they have provided in accordance with an embodiment of the present disclosure. The summary page 505 may be displayed when the client selects the summary button 316 or after the client has completed the photo, text, logo, and music element pages. The summary box 505 shows all the content the client has provided to-date. In the example of FIG. 5, the summary box 505 shows that the client has selected a song and submitted photos and three lines of text. The summary box 505 also shows any extras the client has provided such as video clips or the client's own audio files. In example of FIG. 5, the summary box 505 shows that the client has also submitted video clips. For the photos and the logo, thumbnail size images may be shown in the summary box 505. For the video clips, a thumbnail size image representing each of the video clips may be shown in the summary box 505.

The summary box 505 allows the client to review all content provided by the client. The client can select the appropriate element button in the elements menu bar 300 to go to the corresponding element page to make a change to the content or to add content. If the client is satisfied with the content and is ready to have the video made, he clicks on the next button 510, which brings the client to a check out page to place the order. The client then has the opportunity to approve the content supplied and ensure that it does not infringe on any copyright. The client has a limited timeframe to submit the project for production. The workspace screen includes a counter 515 that shows the amount of time that is left for the client to submit the project.

Figure 6:
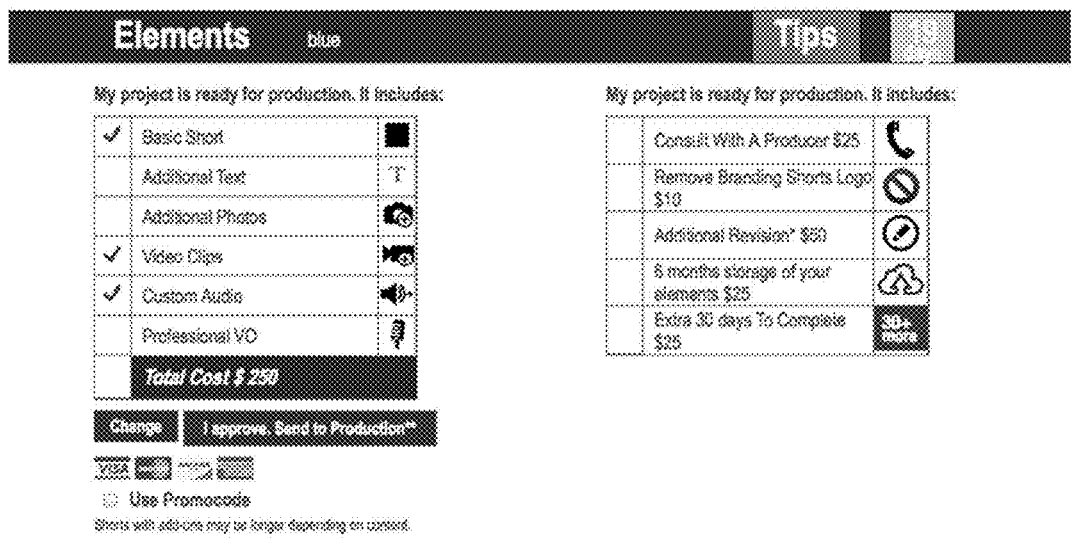

FIG. 6 illustrates a checkout page where a summary of the base project package and any additional content is shown, in accordance with an embodiment of the present disclosure. The client can elect to make a change or approve the content purchase and send to production. The client can also elect to purchase other items, such as additional time to submit a project, a consult with a producer, more revisions, additional storage, etc. Once the client has made their selections, the ultimate price is calculated and they proceed to checkout, which takes them to a secure payment site. Once this is completed, an email is generated to the client to confirm the order. The order and packaged project files go to a server and is accessed by an administrator or project management team. If an active project is over X days in duration and an order has not been placed (the client has not checked out), a reminder email may be sent to the client to let the client know the project workspace is available until the end of a specified date if they would like to proceed, or the project will be deleted.

Figure 7:
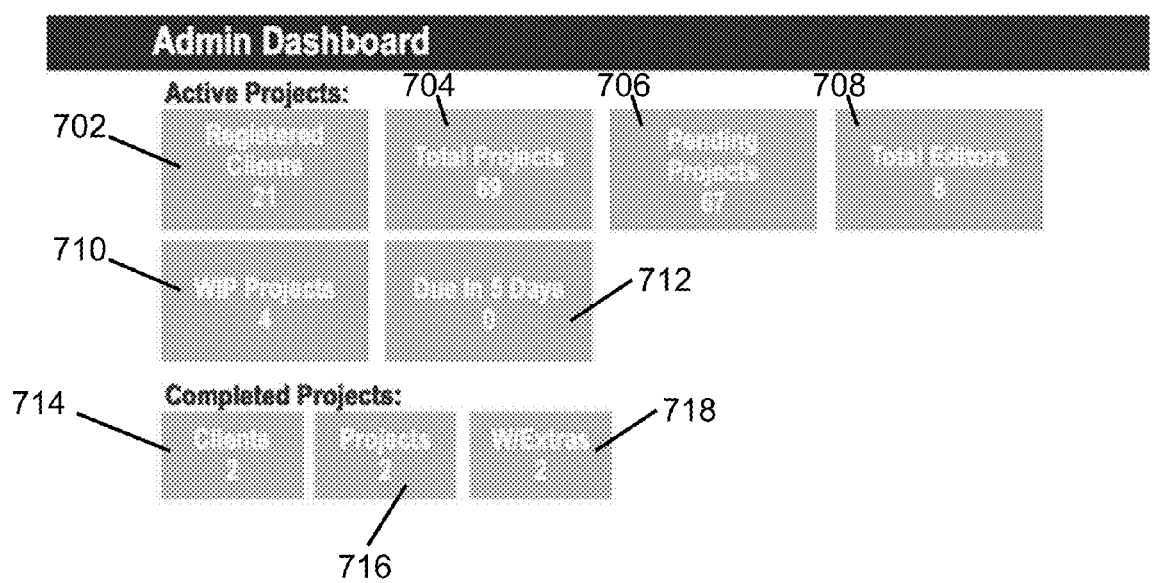

FIG. 7 illustrates an administrator dashboard page in accordance with an embodiment of the present disclosure. In some aspects, only the administrator or manager can access this page. This page provides the administrator or manager the opportunity to view and access information for all projects, clients, and editors. After an administrator signs in, she has an overview of all of the projects at hand in various stages of production with a live counter. The administrator can view information such as the number of clients, projects, pending projects (pending approval), projects in production, editors, and due dates in real time. In addition, the administrator can view the number of completed projects, number of clients with completed projects, and the number of projects that contain extra content.

The administrator can click on any button in the dashboard to connect to a screen with detailed information on that item. For active projects, these buttons include a registered clients button 702, a total projects button 704, a pending projects button 706, a total editors button 708, a WIP (Work in Progress) projects button 710, and a due date button 712. The due date button 712 shows the number of projects that are due within a predetermined period. For complete projects, the administrator dashboard includes a client button 714, a projects button 716, and a With Extras button 718.

Figures 8, 9:
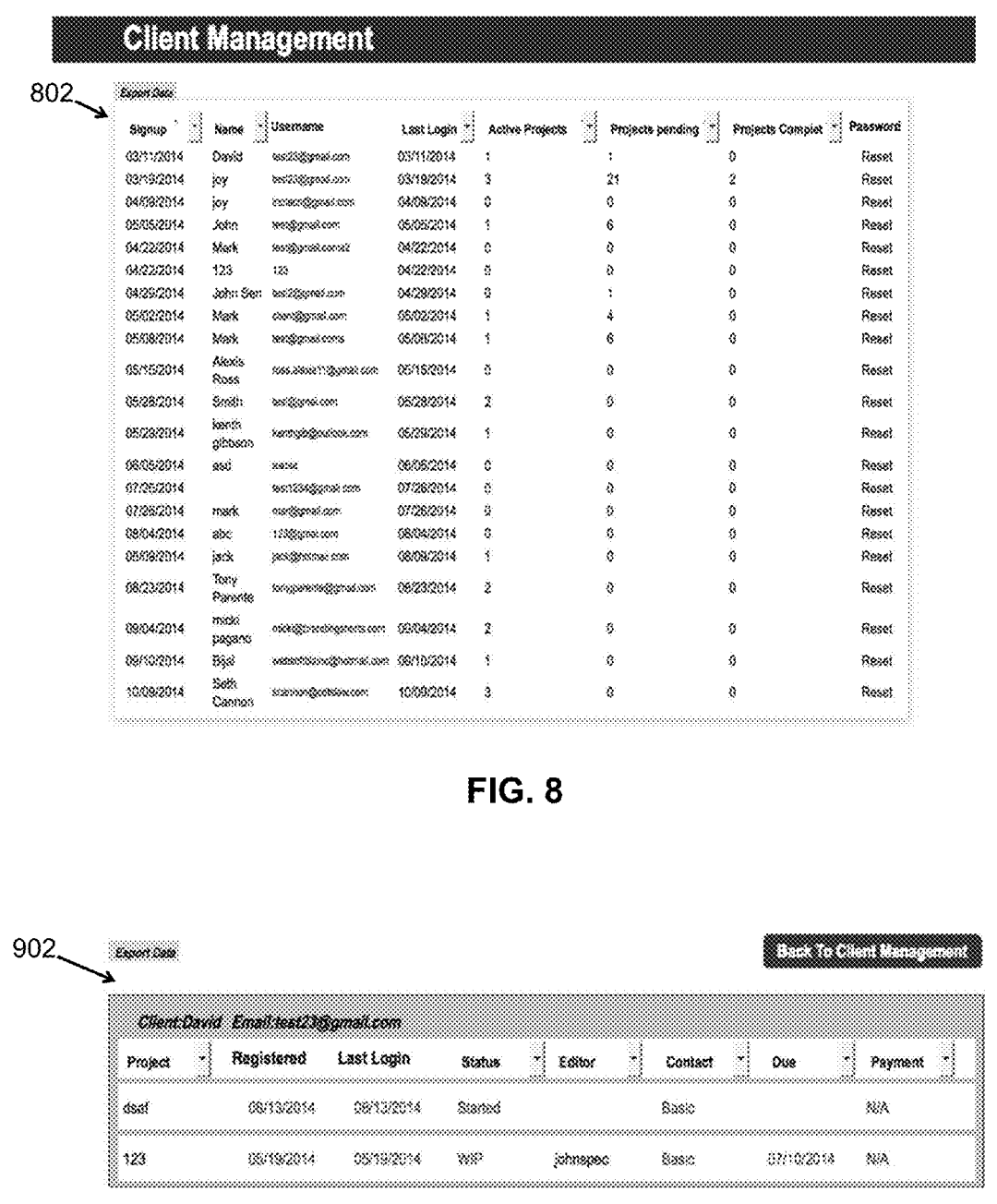

FIG. 8 illustrates an administrator client management page 802 in accordance with the embodiment of the present disclosure. Here the administrator has access to all the clients that have initiated a project to create a video. The client's contact information and activity such as sign up date and last log in is also included. In addition, the administrator can see how many projects the client has started and the status of the project (e.g., active, pending, or completed). The administrator also has the ability to see the client's user id and reset a client's password when necessary. In addition, the data for many of these categories can be sorted. The data can also be exported to a spreadsheet and downloaded onto the administrator computing device.

FIG. 9 illustrates an administrator client detail screen 902 in accordance with an embodiment of the present disclosure. On this page, the administrator can click on any given client and see the details of that particular client's account, such as the client contact information, registration date, last log in, the projects he has in his account, which editor is assigned to each client's project, and the status of a project, whether it is a new project, a work in progress, a project under review, or a completed project. The administrator also sees the due dates for each project, the type of project package the client has purchased, if a payment has been made, and, if so, the amount paid, etc. The administrator can also sort the data by date, editor, status, etc. He also has the ability to export the data to a spread sheet and download it to his computing device. After the administrator is done reviewing the details for that particular client, she can click on a button that takes the administrator back to the client management page for an overview of all clients and their projects.

Figures 10, 11:

FIG. 10 illustrates an administrator editor management screen 1002 in accordance with an embodiment of the present disclosure. The administrator editor management screen 1002 provides an overview of all the editors working on projects. The administrator can view each editor's contact information, user name, sign-up date, active projects, and completed projects. The administrator also has the ability to add or delete an editor, if necessary. The administrator can also reset an editor's password, and sort the data in active projects and completed projects. The data can also be exported to a spreadsheet and downloaded onto the administrator's computing device.

FIG. 11 illustrates an administrator editor management detail screen 1102 in accordance with an embodiment of the present disclosure. FIG. 11 demonstrates how an administrator can view details of a specific editor, such as an editor's contact information, the various projects she is working on, the clients associated with each project, when the editor received the projects, the due dates for each project, and the status of each project the editor is working on, whether it is under review, a work in progress, a new assignment, a completed project, a revised project, or an approved project. The administrator can also see when each project is due and the client notes associated with each project, if provided. The administrator can quickly view the amount of projects the editor has completed at a glance, at the top of the administrator editor management detail screen 1102. The administrator can also sort the information by client, date received, due date, and status of the project.

Figure 12:
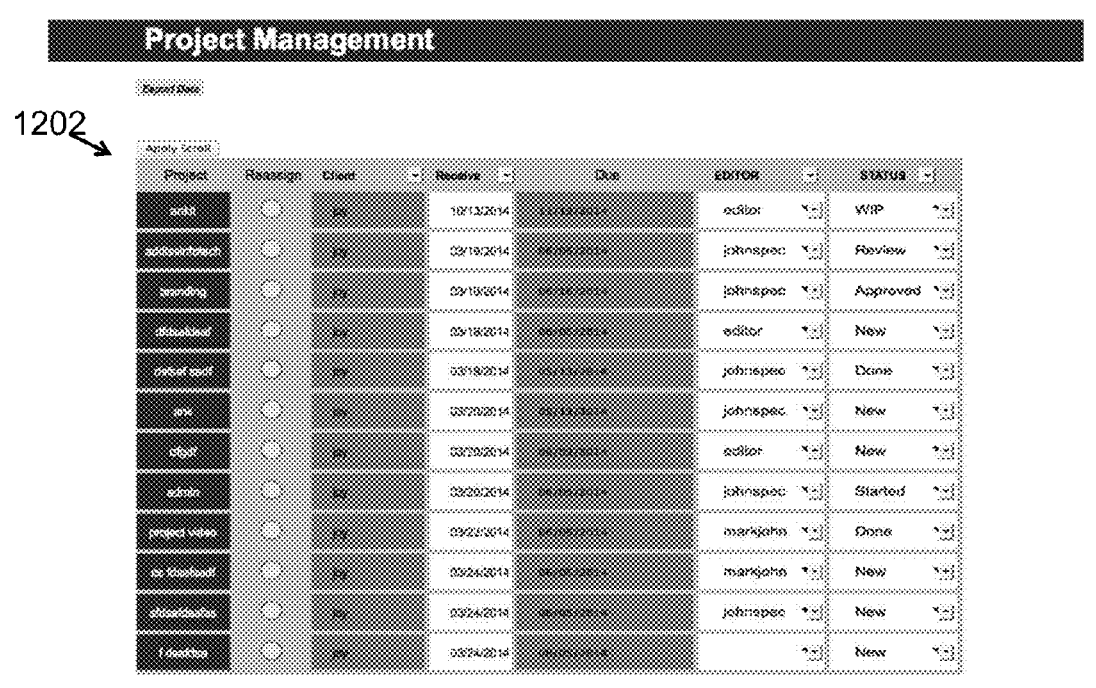

FIG. 12 illustrates an administrator project management screen 1202 in accordance with an embodiment of the present disclosure. In screen 1202, the administrator can view all projects that have been submitted by clients, when projects were received, project due dates, and the editors assigned to each project. The administrator can also view the status of each project, whether it is a new project, a work in progress, a project in review, a completed project, a reassigned project, etc. The administrator can sort the data by date received, due date, editor, client, and status. For example, the administrator can sort the information to view all the projects due within a week and choose to follow up with the editors associated with those particular projects.

The administrator can assign a project to an editor from screen 1202 by clicking on a project and choosing an editor from the drop-down menu. The administrator can also elect to reassign a project to another editor should the need arise to move a project from one editor to another by clicking on the reassign option button, which allows the administrator to choose another editor from the drop-down menu. The administrator can enable a scroll button to be able to view all the information on one page. The administrator can also elect to export the data to a spreadsheet and download it to the administrator computing device.

Figure 13:
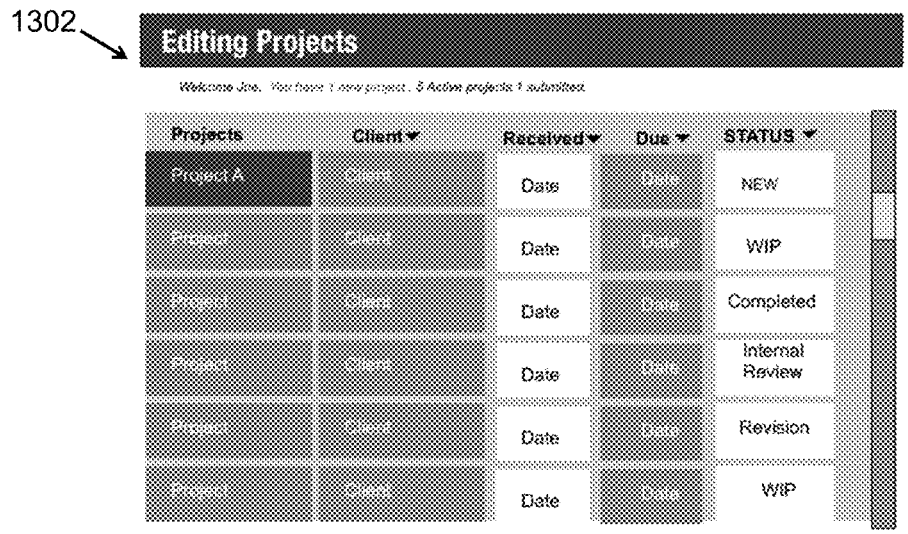
FIGS. 13-15 illustrate professional editor screens that are displayed by the server according to embodiments of the present disclosure.

FIG. 13 illustrates an editor overview screen 1302 in accordance with an embodiment of the present disclosure. The editor overview screen 1302 shows how an editor would view her roster of work projects, which can be categorized by client, date received, due date, and status of the project. The editor can also view a summary of the status of her projects above the project listing notifying her if she has a new project, how many projects are active, and the number of projects that have been submitted to date. The editor has the ability to sort the projects by due date, date received, client, or status of the projects, whether they are works in progress, they have been submitted, they are under internal review, they need revisions, or they are completed. The editor also has the ability to scroll through the projects, thus enabling her to view everything on one page.

To get to screen 1302, an editor can either register or sign in to her account. If an editor is new to the system, she would register, signing up with a username and password, in order to access screen 1302.

Figure 14:
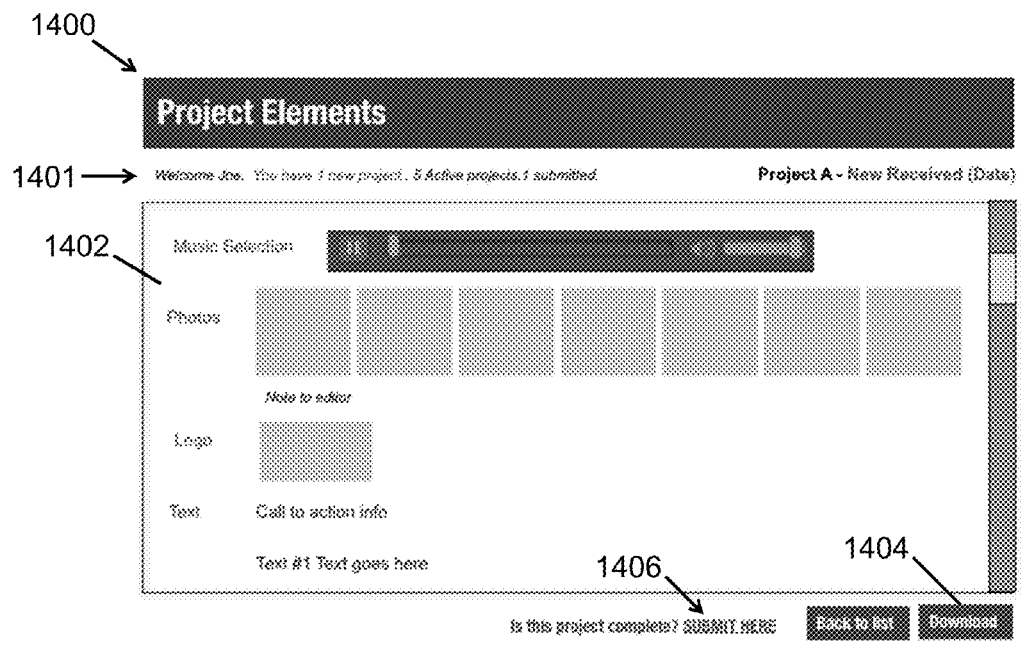

FIG. 14 illustrates a project elements screen 1400 the editor would access and use to view all elements a client has submitted for a project assigned to that editor in accordance with an embodiment of the present disclosure. Within this page, the editor can view a summary 1401 of the new, active, and submitted projects assigned to the editor. In addition, the name of the new project with an indicator noting that it is a new project is displayed along with the associated content for the project. As shown, an editor can view content, such as photos, video footage, a logo, text, and a music file, in a content box 1402. The screen 1400 may also include any parameters or notes from the client and any other additional assets supplied by the client for the editor to include in the video project.

The editor can download and store the files onto his or her computing device in order to begin the professional editing process with the professional editing software on her computing device. The editor clicks on download button 1404 to open a file save or manager window to enable the editor to save the content files. The editor can select a directory or create a new folder to save the content files. Once the download button 1404 is clicked, all the content files are saved on the selected directory. Photo, footage, and logo files are saved as the file type they were uploaded (e.g., .jpeg, .png, .tiff, .mov, .mp4, etc.). The music would be included in a file format (e.g., mp3, aif, way, etc.) from the music library. And the text is converted to a text file.

The editor can also choose to return to the list of projects they are currently working on. An editor can view the contents for an existing project in the event she needs to re-download any particular content for any reason, or review the content material again before he or she completes and submits the project. After the editor completes a video job or project, she can submit it by clicking the text "Submit Here" 1406, which causes the screen of FIG. 15 to be displayed.

Figure 15:
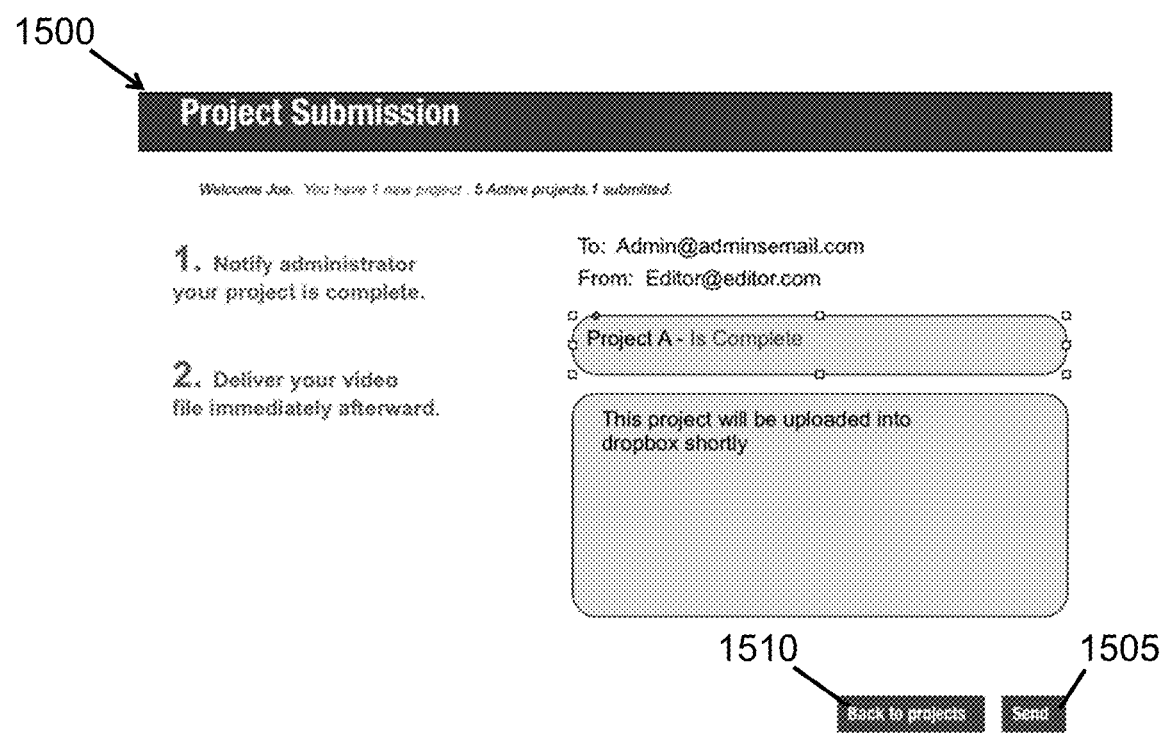

FIG. 15 illustrates a project submission screen 1500 through which the editor submits a completed project to the administrator in accordance with an embodiment of the present disclosure. Once the editor has completed editing the project, she clicks on the send button 1505 to send the completed project to the administrator. Alternatively, the editor can select the "Back to projects" button 1510 to go back to screen 1302 of FIG. 13. On the project submission screen 1500, the editor is presented with a form to communicate to the administrator indicating the project she has been working on is completed. Once the form is sent, it would prompt the editor to send the file via a predetermined file delivery system or via a link such as You Tube or Vimeo, etc., in which the administrator can view the completed project or job to approve or send comments back to the editor if revisions need to be made, ensuring quality control before the administrator sends the link to the client for the client's approval.

Figure 16:
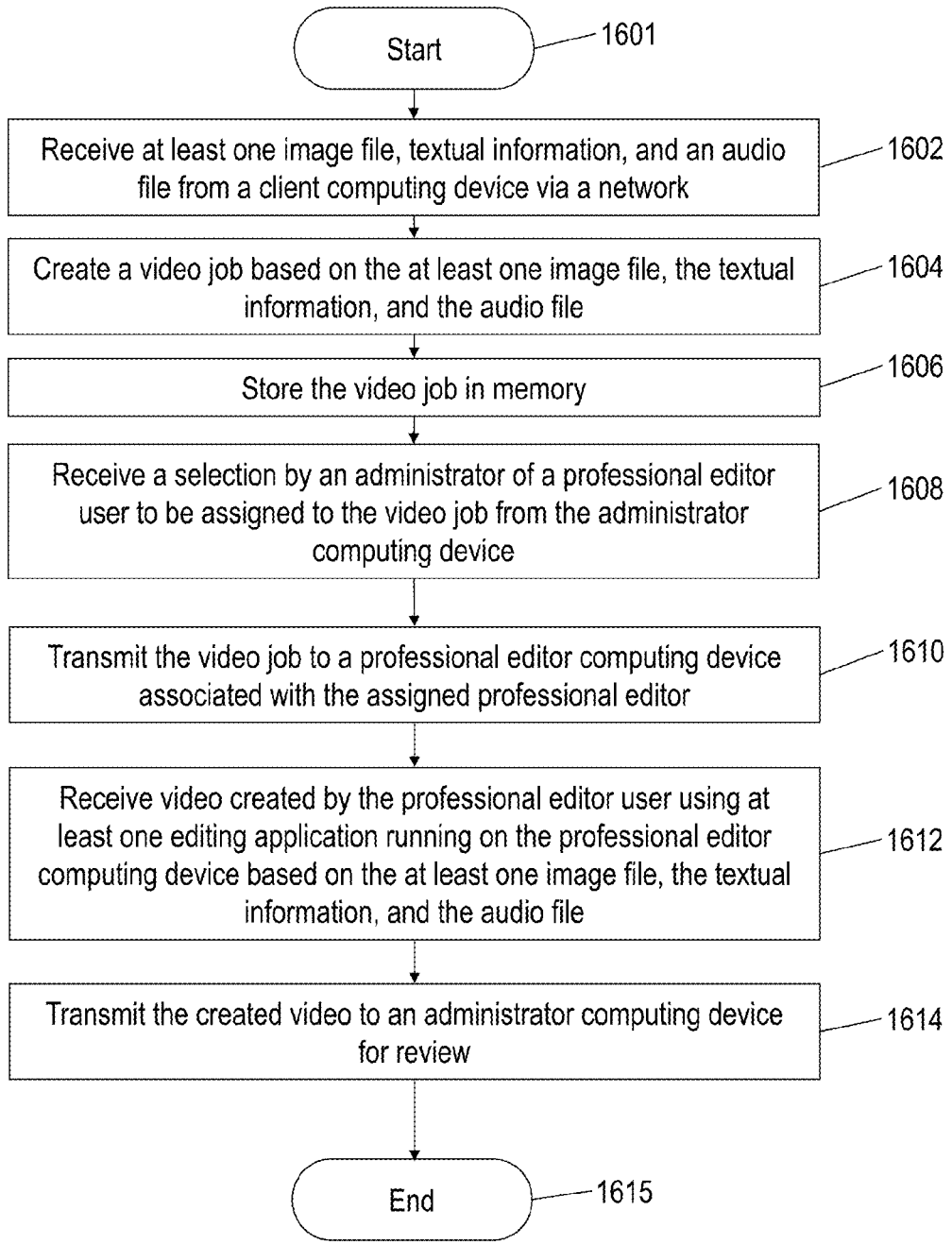
FIGS. 16-18 are flowcharts of methods for creating custom professional video according to an embodiment of the present disclosure.
Figure 17:
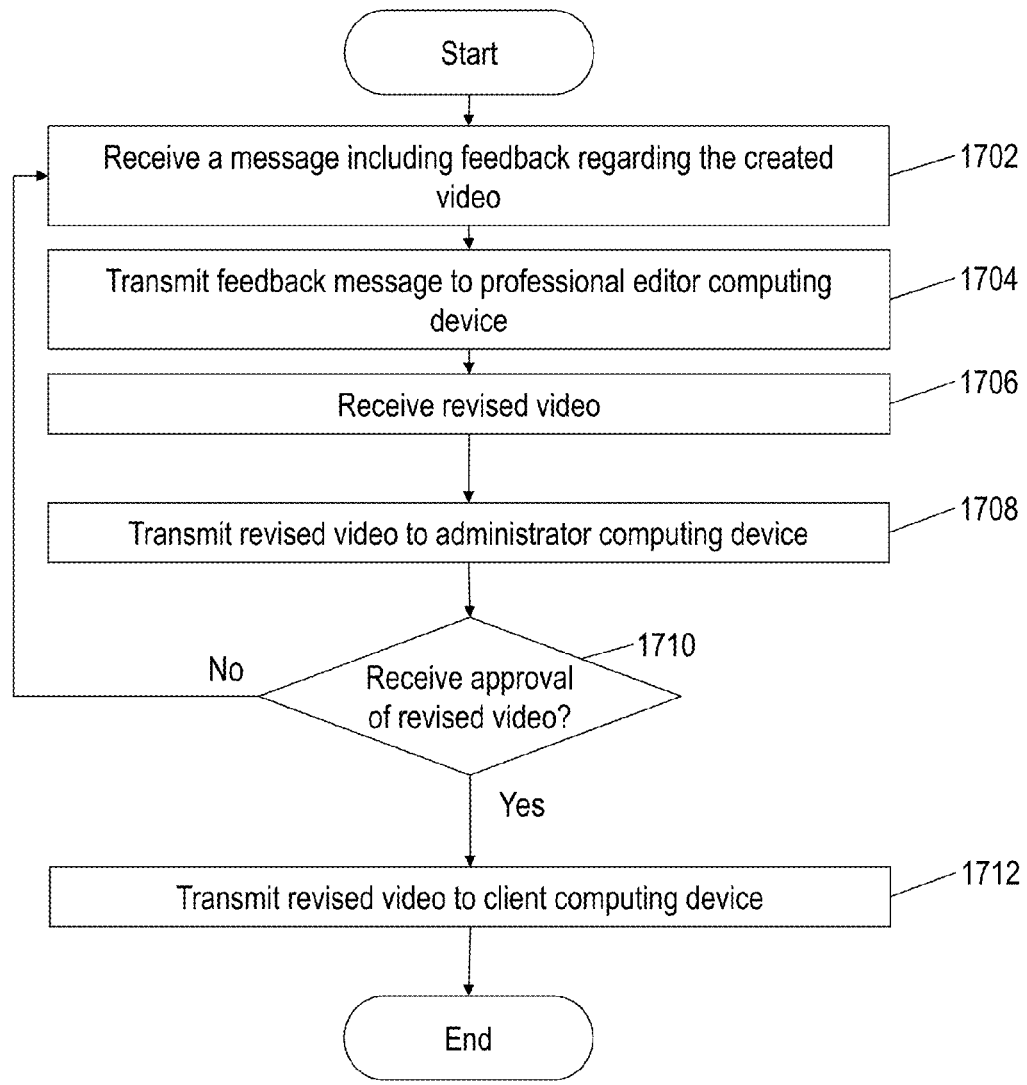
Figure 18:
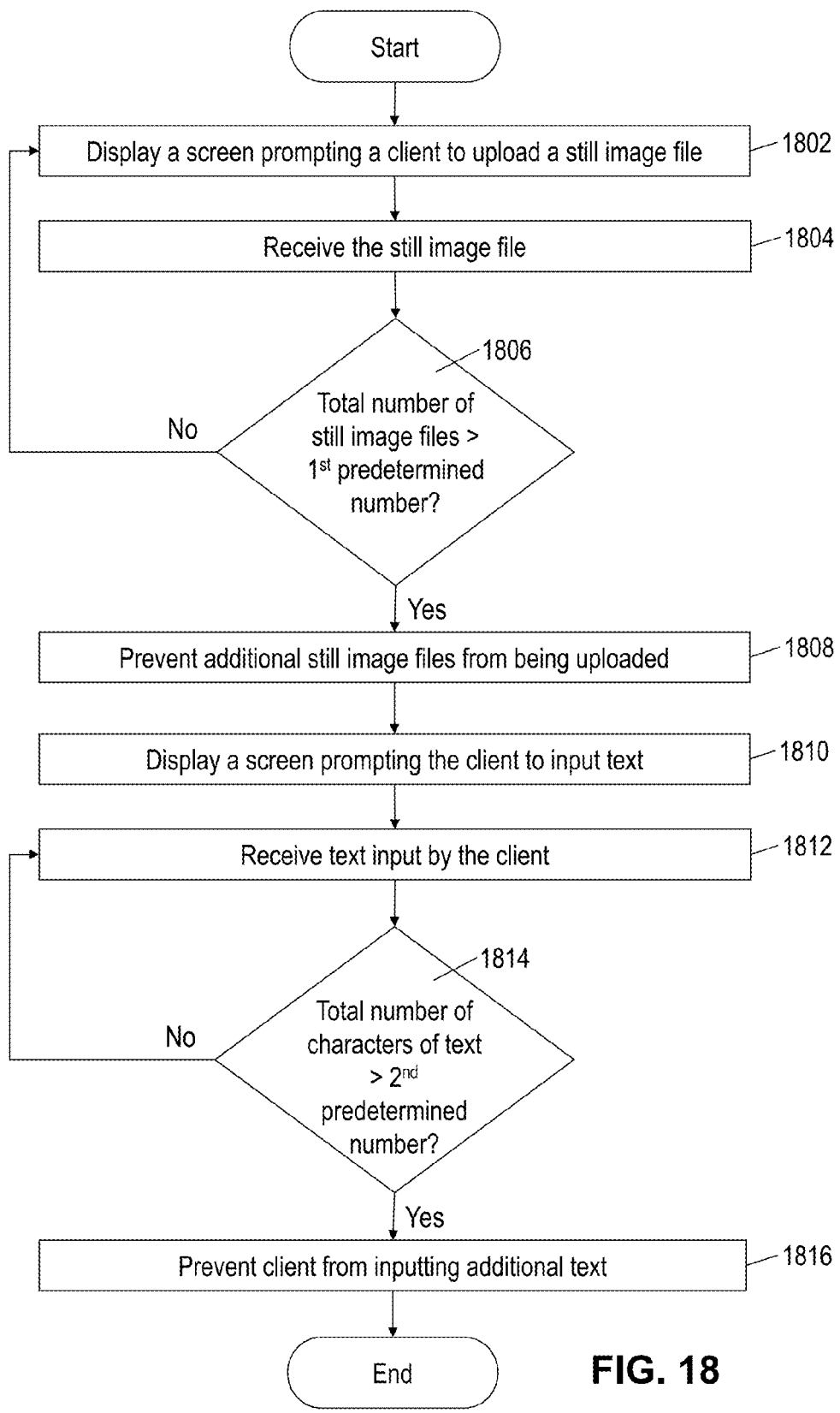

FIGS. 16-18 are flowcharts illustrating a method for creating custom professional videos according to embodiments of the present disclosure. As shown in FIG. 16, after starting in step 1601, a server receive at least one image file, textual information, and an audio file from a client computing device via a network in step 1602. In step 1604, the server creates a video job based on the at least one image file, the textual information, and the audio file. In step 1606, the video job is stored in memory. In step 1608, the server receives a selection by an administrator of a professional editor to be assigned to the video job from the administrator computing device. In step 1610, the server transmits the video job to a professional editor computing device associated with the assigned professional editor. In step 1612, the server receives a video created by the professional editor using at least one editing application running on the professional editor computing device based on the at least one image file, the textual information, and the audio file. Before ending in step 1614, the server transmits the created video to an administrator computing device for review.

Turning now to FIG. 17, in the case where the administrator has feedback regarding created video, the server receives a message including the feedback regarding the created video in step 1702. The feedback may include revisions to the video. In step 1704, the feedback message is transmitted to the professional editor computing device so that the professional editor can revise the video in accordance with the feedback message. In step 1706, the server receives the revised video and, in step 1708, transmits it to the administrator computing device. In step 1710, the server monitors whether the administrator has approved of the revised video. If the server determines that the administrator has not approved of the revised video, steps 1702-1708 are repeated. Otherwise, the server transmits the revised video to the client computing device in step 1712.

As described above, the systems and methods of the present disclosure guides the client in the selection of the proper content and the proper amount of content so that a professional video of an appropriate length can be created. FIG. 18 is a flowchart illustrating a method according to the present disclosure of managing the amount of content. After starting, a screen is displayed prompting a client to upload a still image file in step 1802. In step 1804, the still image is received by the server. In step 1806, it is determined whether the total number of still images is greater than a first predetermined number. If it is determined that the total number of still images is greater than the first predetermined number, additional still image files are prevented from being uploaded in step 1808. Otherwise, steps 1802 and 1804 are repeated. In step 1810, a screen is displayed prompting the client to input text, and, in step 1812, text input by the client is received by the server. In step 1814, it is determined whether the total number of characters of text is greater than a second predetermined number. If it is determined that the total number of characters is greater than the second predetermined number, additional characters of text are prevented from being input in step 1816. Otherwise, step 1812 is repeated.

Figure 19:
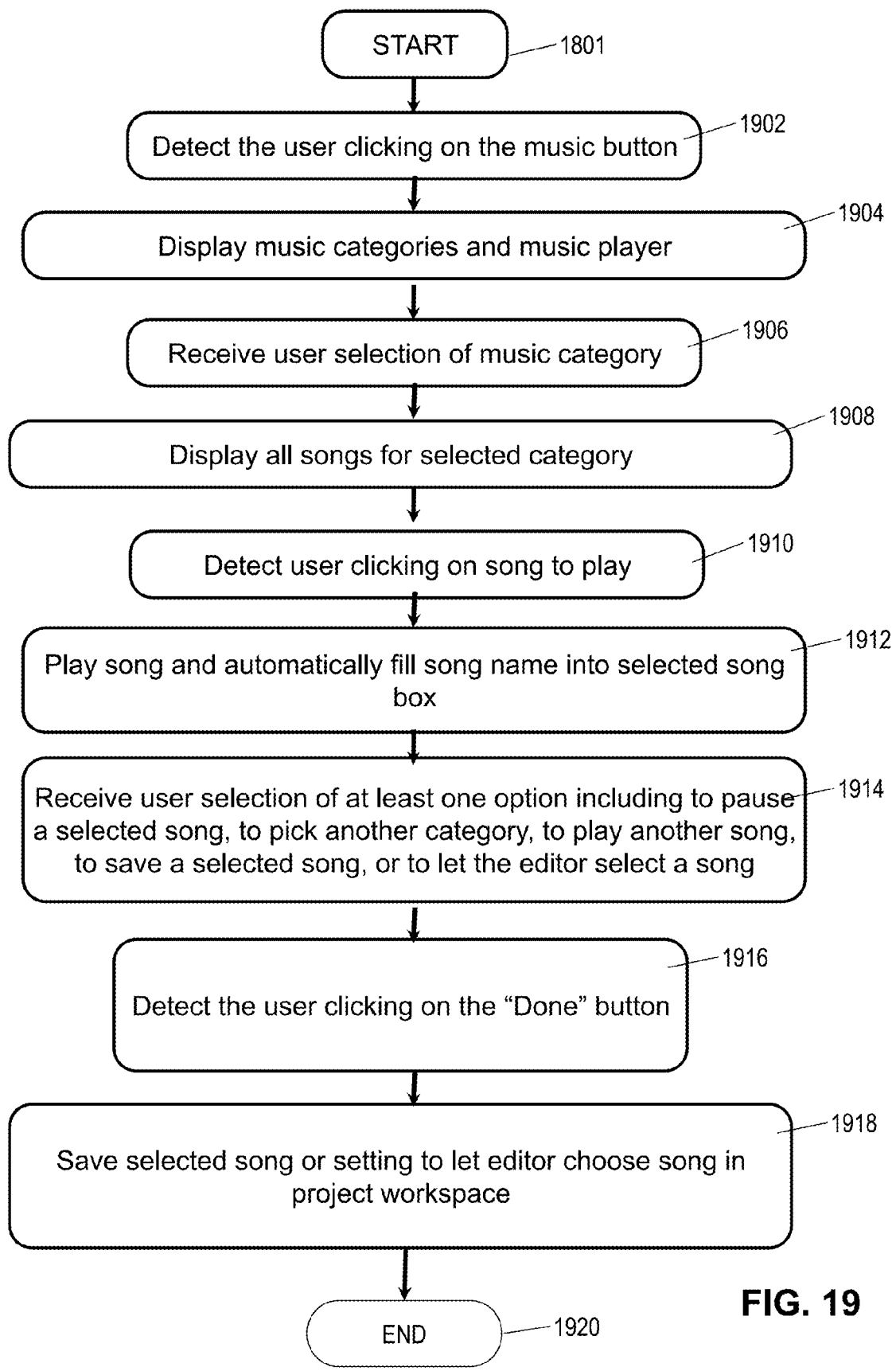
FIG. 19 is a flowchart of a method for selecting audio data according to an embodiment of the present disclosure.

FIG. 19 is a flowchart of a method for selecting audio for inclusion in a video according to an embodiment of the present disclosure. After starting in step 1901, the client application or the editor application running on the system server detects a user, which may include a client or a professional editor, clicking on the music button in step 1902. In step 1904, music categories are displayed with the music player. In step 1906, the system server detects selection of a music category by a user and, in step 1908, all songs for the selected category are displayed to the user. In step 1910, the system server detects a user clicking on a song to play the song and, in step 1912, the song is played and the song name is automatically filled into the selected song box. In step 1914, the system server receives a selection by the user of at least one option including to pause the selected song, to pick another category, to play another song, or to save the selected song. In step 1916, if the system server detects a user clicking on a "Done" button, then the system server saves the selected song or the setting to let the editor choose a song in the project workspace in step 1918.

As described above, the user in the steps of FIG. 19 may be a client or an editor. If the user is a client, the user may be presented with the option to let the editor select a song in step 1914. If the user selects the option to let the editor select a song, information indicating the selection of this option is saved in the project workspace in step 1918.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A method of managing a process of creating custom professional videos, comprising:
   displaying a screen prompting a client user to upload a plurality of image files of a plurality of file types;
   in response to client user selection of a button, displaying a screen including a message providing guidance to the user regarding the plurality of image files including the type of image files to upload;
   displaying a screen prompting the client user to input text data;
   in response to client user selection of the button, displaying a screen including a message providing guidance to the user regarding the text data to input including a type of text data to input;
   displaying a screen prompting the client user to select an audio file;
   in response to client user selection of the button, displaying a screen including a message providing guidance to the client user regarding the plurality of image files;
   in response to client user selection of another button, displaying a screen prompting the client user to input at least one instruction to a professional editor, the at least one instruction including at least one of an order in which the plurality of image files should appear in a custom professional video, a selected image file to leave on the screen longer than others, or a suggested length of the custom professional video;
   displaying a summary screen showing the plurality of image files uploaded by the client user, text inputted by the client user, an audio file selected by the client user, and the at least one instruction to a professional editor;
   displaying selectable items in the summary screen enabling the client user to modify at least one of the plurality of image files uploaded by the client user, the text inputted by the client user, the audio file selected by the client user, or the at least one instruction to the professional editor;
   receiving at a server the at least one image file, the text data, and information specifying the audio file selected by the client user;
   creating a video job based on the at least one image file, the text data, and the selected audio file;
   displaying a screen enabling an administrator to select a professional editor to be assigned to the video job;
   storing information regarding the assigned professional editor;
   displaying a video job summary screen in a professional editor interface associated with the assigned professional editor, the video job summary screen displaying the plurality of image files uploaded by the client user, text inputted by the client user, information specifying the audio file selected by the client user, and the at least one instruction to the professional editor;
   displaying a screen in the professional editor interface prompting a professional editor to download the video job;
   receiving at the server a custom professional video created by the professional editor via the professional editor interface; and
   transmitting a video file associated with the custom professional video to an administrator interface for review.

2. The method according to claim 1, wherein the plurality of image files include moving images or still images.

3. The method according to claim 2, wherein the moving images have a length greater than the video.

4. The method according to claim 1, further comprising displaying a screen prompting a client user to input at least one parameter for the video to be created.

5. The method according to claim 4, wherein the at least one parameter is selected from the group consisting of a desired length of the video, additional revisions to the created video, additional time to complete the video, whether or not the professional editor should select an audio file to be incorporated into the video, a genre of music for the audio file, whether or not the video should include professional voice over, and a tone of the video.

6. The method according to claim 1, further comprising:
   storing a plurality of audio files in memory; and displaying an audio file selection interface including professional editor controls for reviewing and selecting at least one audio file of the plurality of audio files stored in memory.

7. The method according to claim 1, wherein displaying a screen prompting the client user to select the audio file includes displaying a screen prompting the client user to upload the audio file.

8. The method according to claim 1, further comprising:
storing client user data and editor data in memory; and
displaying a dashboard screen in the administrator interface,
wherein the dashboard screen includes selectable buttons for viewing the client user data, the editor data, and data regarding projects.

9. The method according to claim 1, wherein displaying a screen prompting the client user to input text data includes displaying a screen prompting the client user to input text data to be used in creating voice over.

10. The method according to claim 1, further comprising:
receiving data regarding a due date for a project;
determining whether the due date is within a predetermined period; and
displaying, if it is determined that the due date is within the predetermined period, a message in the administrator interface indicating that the due date is within the predetermined period.

11. The method according to claim 10, further comprising displaying at least one project for which the due date is within the predetermined period; and
displaying an administrator input element enabling an administrator to reassign the at least one project to a different professional editor.

12. The method according to claim 1, further comprising:
displaying an administrator input field in which the administrator enters information regarding the custom professional video;
displaying the information regarding the custom professional video in the professional editor interface; and
displaying a screen prompting the professional editor to upload a revised video.

13. The method according to claim 1, wherein the professional editor interface includes a screen that displays at least one thumbnail image corresponding to the at least one image file, the text data, and information specifying the audio file selected by the client user.

14. A method of managing a process of creating custom professional videos, comprising:
displaying, at a client computing device, a screen prompting a client user to upload a plurality of image files of a plurality of file types;
in response to selection of a button at the client computing device, displaying a screen including a message providing guidance to the client user regarding the plurality of image files including the type of image files to upload;
displaying a screen prompting the input of text data to the client computing device;
in response to selection of the button at the client computing device, displaying a screen including a message providing guidance to the client user regarding the text data to input including a type of text data to input;
displaying a screen prompting the client user to select an audio file;
in response to selection of the button at the client computing device, displaying a screen including a message providing guidance to the user regarding the plurality of image files;
in response to selection of another button at the client computing device, displaying a screen prompting the client user to input at least one instruction to a professional editor, the at least one instruction including at least one of an order in which the plurality of image files should appear in a custom professional video, a selected image file to leave on the screen longer than others, or a suggested length of the custom professional video;
displaying a summary screen showing the plurality of image files uploaded by the client user, text inputted by the client user, an audio file selected by the client user, and the at least one instruction to a professional editor;
displaying selectable items in the summary screen enabling the client user to modify at least one of the plurality of image files uploaded by the client user, text inputted by the client user, the audio file selected by the client user, or the at least one instruction to the professional editor;
receiving, at a server, the plurality of image files, the text data, the audio file, and the at least one instruction to the professional editor from the client user computing device via a network;
creating a video job based on the plurality of image files, the text data, and the audio file;
storing the video job in the server;
receiving at the server a selection by an administrator of a professional editor to be assigned to the video job;
associating the professional editor with the stored video job;
transmitting the video job to a professional editor computing device associated with the assigned professional editor;
displaying a video job summary screen in a professional editor interface associated with the assigned professional editor, the video job summary screen displaying the plurality of image files uploaded by the client user, text inputted by the client user, an audio file selected by the client user, and the at least one instruction to the professional editor;
receiving at the server a custom professional video created by the professional editor using at least one application running on the professional editor computing device based on the at least one image file, the text data, and the audio file;
transmitting the custom professional video to an administrator computing device for review; and
transmitting the custom professional video to the client computing device if the administrator computing device provides an approval message.

15. A system for creating custom professional videos, comprising:
a server configured to:
display a screen prompting a client user to upload a plurality of image files of a plurality of file types;
in response to client user selection of a button, display a screen including a message providing guidance to the user regarding the plurality of image files including the type of image files to upload;
display a screen prompting the client user to input text data;
in response to client user selection of the button, display a screen including a message providing guidance to the client user regarding the text data to input including a type of text data to input;

display a screen prompting the client user to select an audio file;

in response to client user selection of a button, display a screen including a message providing guidance to the client user regarding the plurality of image files;

in response to client user selection of another button, display a screen prompting the client user to input at least one instruction to a professional editor, the at least one instruction including at least one of an order in which the plurality of image files should appear in a custom professional video, a selected image file to leave on the screen longer than others, or a suggested length of the custom professional video;

display a summary screen showing the plurality of image files uploaded by the client user, text inputted by the client user, an audio file selected by the client user, and the at least one instruction to a professional editor;

display selectable items in the summary screen enabling the client user to modify at least one of the plurality of image files uploaded by the client user, text inputted by the client user, the audio file selected by the client user, or the at least one instruction to the professional editor;

receive at least one image file, text data, and information specifying an audio file selected by the client user from a client computing device via a network;

create a video job based on the at least one image file, the text data, and the audio file;

store the video job in memory of the server;

receive a selection by an administrator of a professional editor to be assigned to the video job;

associate the professional editor with the stored video job;

transmit the video job to a professional editor computing device associated with the assigned professional editor;

receive a custom professional video created by the professional editor using at least one application running on the professional editor computing device based on the at least one image file, the text data, and the audio file;

transmit the created video to an administrator computing device; and transmit the created video to the client computing device;

an administrator computing device configured to:

transmit a selection by an administrator of a professional editor to be assigned to the video job to the server;

receive the custom professional video for review;

transmit a message include feedback regarding the custom professional video; and receive revised video for further review; and a professional editor computing device including:

a display for displaying a video job summary screen in a professional editor interface associated with the assigned professional editor, the video job summary screen displaying the plurality of image files uploaded by the client user, text inputted by the client user, an audio file selected by the client user, and the at least one instruction to the professional editor;

a communications interface configured to receive the video job from the server and to transmit created video to the server; and a hardware processor configured to run at least one editing application used to create the video based on the video job which includes at least one image file, the text data, and the audio file.

16. The system according to claim 15, wherein the server is further configured to:

display an administrator input field in which the administrator enters data regarding the custom professional video;

display the data regarding the custom professional video in a professional editor interface; and display a screen prompting the professional editor to upload the revised video.

17. A server for managing a process of creating custom professional videos, comprising:

a communications interface configured to receive a plurality of image files, text data, information regarding a selection of an audio file, and at least one instruction to a professional editor from a client computing device via a network;

a memory; and a hardware processor configured to:

display, at the client computing device, a screen prompting a client user to upload a plurality of image files of a plurality of file types;

in response to client user selection of a button, display a screen including a message providing guidance to the client user regarding the plurality of image files including the type of image files to upload;

display a screen prompting the client user to input text data;

in response to client user selection of the button, display a screen including a message providing guidance to the client user regarding the text data to input including a type of text data to input;

display a screen prompting the client user to select an audio file;

in response to user selection of the button, display a screen including a message providing guidance to the client user regarding the plurality of image files;

in response to client user selection of another button, display a screen prompting the client user to input at least one instruction to a professional editor, the at least one instruction including at least one of an order in which the plurality of image files should appear in a custom professional video, a selected image file to leave on the screen longer than others, or a suggested length of the custom professional video;

display a summary screen showing the plurality of image files uploaded by the client user, text inputted by the client user, an audio file selected by the client user, and the at least one instruction to a professional editor;

display selectable items in the summary screen enabling the client user to modify at least one of the plurality of image files uploaded by the client user, text inputted by the client user, the audio file selected by the client user, or the at least one instruction to the professional editor;

create a video job based on the at least one image file, the text data, and the audio file;

store the video job in the memory;

receive a selection by an administrator of a professional editor to be assigned to the video job;

associate the professional editor with the stored video job in the memory;

transmit the video job to a professional editor computing device associated with the assigned professional editor;

display a video job summary screen in a professional editor interface associated with the assigned professional editor, the video job summary screen displaying the plurality of image files uploaded by the client user, text inputted by the client user, an audio file selected by the client user, and the at least one instruction to the professional editor;

receive a custom professional video created by the professional editor using at least one editing application running on the professional editor computing device based on the at least one image file, the text, and the audio file;

transmit the custom professional video to an administrator computing device; and transmit the custom professional video to the client computing device.

18. The server according to claim 17, wherein the hardware processor is further configured to:

store client information and editor information in memory; and display a dashboard screen in an administrator interface, wherein the dashboard screen includes selectable buttons for viewing the client information, the editor information, and information regarding projects.

19. The server according to claim 17, wherein the communications interface is further configured to receive information regarding a due date for a project, and wherein the hardware processor is further configured to:
determine whether the due date is within a predetermined period; and
display, if it is determined that the due date is within the predetermined period, a message in an administrator screen indicating that the due date is within the predetermined period.

20. The server according to claim 17, wherein the hardware processor is further configured to:

display at least one project for which a due date is within a predetermined period; and display an administrator input element enabling an administrator to reassign the at least one project to a different professional editor.

\* \* \* \* \*